Patented Oct. 21, 1930

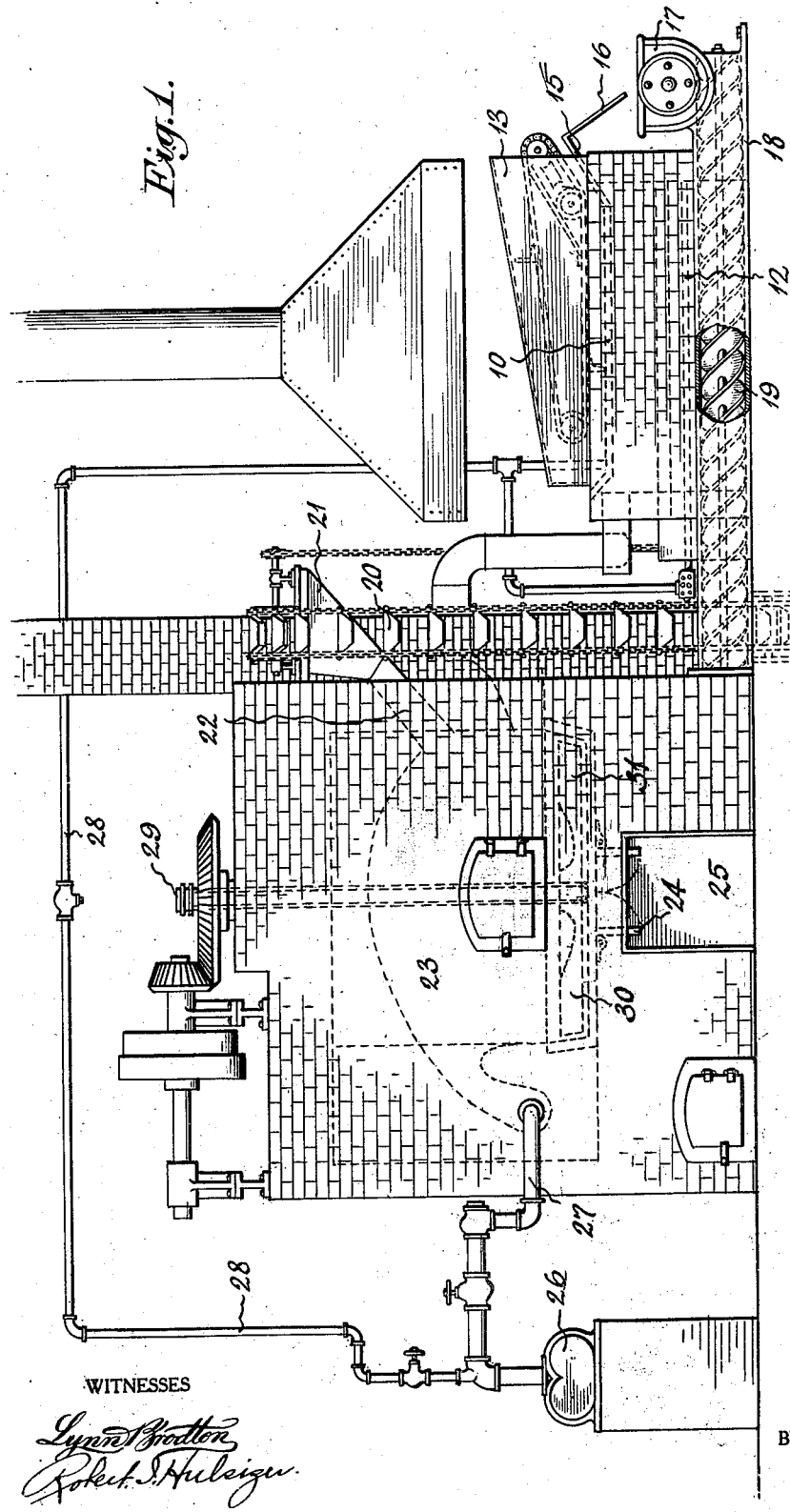

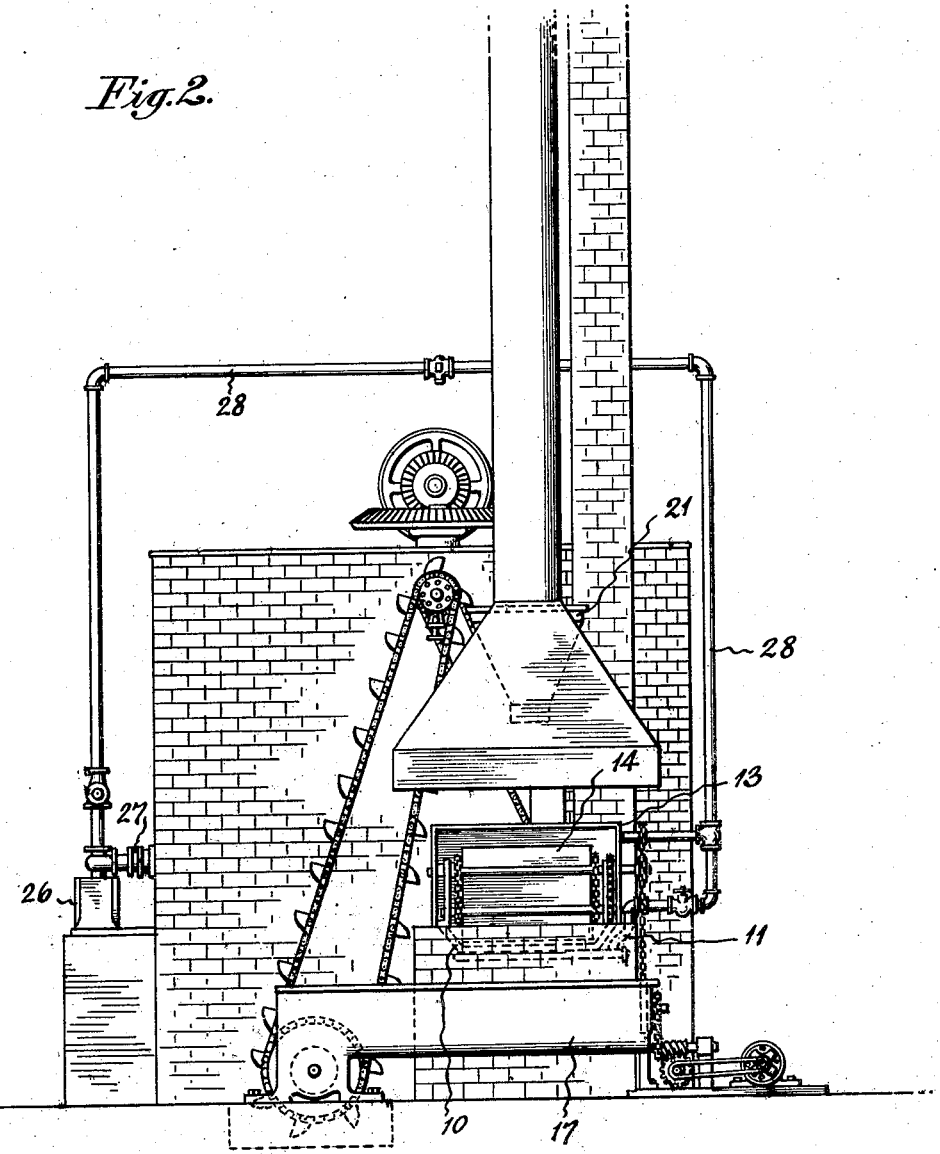

1,779,003

UNITED STATES PATENT OFFICE

EDGAR KNAPP AND CARL G. ALLGRUNN, OF MIDDLEPORT, NEW YORK, ASSIGNORS TO NIAGARA SPRAYER COMPANY, OF MIDDLEPORT, NEW YORK, A CORPORATION OF NEW YORK

METHOD AND APPARATUS FOR THE MANUFACTURE OF LITHARGE

Application filed May 5, 1925. Serial No. 28,271.

This invention relates to a method and apparatus for the manufacture of litharge.

An object of the invention is to provide a simple method for the manufacture of litharge.

Another object concerns the provision of simple and efficient means whereby the improved method can be applied.

The invention is illustrated in the drawings, of which—

Figure 1 is a side elevation of the apparatus with portions broken away; and

Figure 2 is an end elevation thereof.

The form of the invention shown in the drawings is a preferred form, although it is understood that modifications in the construction and arrangement of the parts and in the character of the materials used may be adopted without departing from the spirit of the invention as set forth in the appended claims.

The invention in its general aspect as a method includes a new step in the formation of litharge from lead which comprises forcing air into the molten lead at various points throughout the body of liquid and then skimming off the litharge which forms at the top surface of the liquid. We believe it to be new to form litharge on the surface of a body of molten lead by forcing air through the body of liquid. We also believe it to be new to combine with this apparatus a machine for skimming off the litharge as soon as it is formed. We also believe it to be new to combine with the above-mentioned apparatus an apparatus for carrying the litharge from the initial pan to a furnace where it is finished.

The preferred form of the invention is shown in the drawings, which also illustrate the new method employed. In this apparatus, developed to apply the method of making litharge above referred to, we employ a melting pan 10, shown in dotted lines in both of the figures. This pan, along its bottom and in any suitable detail manner (not shown) is provided with a series of holes connected to pipes such as 11 whereby air may be suitably forced into the bottom of the liquid and up through the body of liquid at the same time that the oil or gas burners 12 are heating the pan. A suitable hood 13 is placed over the pan. Within the hood is disposed a plurality of skimmers such as 14 in the form of plates connected in any desired manner to an endless chain or belt and operated through suitable gearing to move across the surface of the liquid in the pan 10 to skim the litharge floating on the surface, up an incline 15 where the liquid lead can drain and return to the pan, and the litharge is carried up to drop down an inclined plate 16 into a trough 17 having a screw conveyor moving the litharge to one end, where it drops into a trough 18 containing a screw conveyor 19. This conveys the litharge to a point where it is carried up by elevator buckets 20 to a hopper 21. From this hopper it drops down through a chute 22 into a finishing furnace chamber 23. This furnace chamber has bottom doors 24 which can be opened to allow a charge of finished litharge to drop out into a pit 25 where it can be cooled.

An air pump 26 is connected to a pipe 27 leading to the finishing chamber, and by a pipe 28 to the air chutes below the pan 10 and to the hood 13 above the pan.

It will be obvious, therefore that in the operation of the device the pan of molten lead is heated preferably to about 550° C., during which time air is being forced upward through the bottom of the pan and through the lead at various points by means of the plurality of pipes distributed over the whole bottom surface of the pan. The action of the air on the lead causes a formation of partially formed litharge which floats on the surface of the liquid. This formation is removed by means of the skimmers attached to the endless chain. This operation of the skimmer is continuous, carrying off the product as fast as it is formed. At the end of the pan the product is carried up an incline of sufficient length to allow the excess lead to drain back into the pan. At the top of the incline it falls on an apron and slides into a trough, unless it is removed by means of a screw conveyor to a bucket elevator carrying it up into the hopper arranged above and near the finishing furnace.

From the hopper it is fed into the finishing furnace and heated to about 600° C. This furnace is provided with a shaft 29 carrying two or more arms such as 30 and 31 acting as agitator arms. These arms are driven by any suitable means, such as gearing, at a speed of about two R. P. M. These agitators keep the mass in constant agitation for about three or four hours. It is then taken out of the furnace by opening the bottom doors. After it is cooled in the pit it is taken out and ground.

What we claim is:—

1. A method of manufacturing litharge from metallic lead, which comprises melting lead, forcing air up through the molten lead to partially form litharge, then continuously skimming off the litharge floating on the top of the liquid as fast as it is formed, and then conveying the litharge thus collected to a finishing furnace and subjecting it in said furnace to stirring, in intimate contact with gaseous oxygen.

2. A method of manufacturing litharge from metallic lead, which comprises melting the lead, forcing air up through the molten lead to partially form litharge, then continuously skimming off the litharge floating on the top of the liquid as fast as it is formed, draining off the excess of molten lead from the partially formed litharge, and then conveying the litharge thus collected to a finishing furnace and subjecting it in said furnace to stirring, in intimate contact with gaseous oxygen.

3. A method of manufacturing litharge from metallic lead, which comprises melting the lead, forcing air up through the molten lead to partially form litharge, then continuously skimming off the litharge floating on the top of the liquid as fast as it is formed, and then conveying the litharge thus collected to a finishing furnace and subjecting it in said furnace to stirring, in intimate contact with gaseous oxygen at a temperature higher than that of the molten lead.

4. A method of manufacturing litharge from metallic lead, which comprises melting the lead, maintaining the melted lead at a temperature of about 550 degrees C., forcing air up through the molten lead to partially form litharge, then continuously skimming off the litharge floating on the top of the liquid as fast as it is formed, and then conveying the litharge thus collected to a finishing furnace and maintaining it in said finishing furnace at a temperature of about 600 degrees C., while stirring in intimate contact with air.

EDGAR KNAPP.
CARL G. ALLGRUNN.